US010948408B2

(12) United States Patent
Bernacki et al.

(10) Patent No.: US 10,948,408 B2
(45) Date of Patent: Mar. 16, 2021

(54) TOROIDAL MULTIPASS ABSORPTION DEVICE

(71) Applicant: Battelle Memorial Institute, Richland, WA (US)

(72) Inventors: Bruce E. Bernacki, Kennewick, WA (US); Mark C. Phillips, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 16/452,018

(22) Filed: Jun. 25, 2019

(65) Prior Publication Data
US 2020/0408679 A1    Dec. 31, 2020

(51) Int. Cl.
*G01N 21/00* (2006.01)
*G01N 21/39* (2006.01)
*G02B 17/00* (2006.01)
*G01N 21/03* (2006.01)

(52) U.S. Cl.
CPC .......... *G01N 21/39* (2013.01); *G01N 21/031* (2013.01); *G02B 17/004* (2013.01)

(58) Field of Classification Search
CPC .. G01N 15/0205; G01N 21/532; G01N 21/53; G01N 2021/6469; G01N 2021/391; G01N 2021/7789; G01N 2015/0046; G01J 3/42
USPC .... 356/246, 432–440, 335–343, 72–73, 300, 356/301, 451; 250/574, 339.13, 339.07; 359/121.2
See application file for complete search history.

(56) References Cited

U.S. PATENT DOCUMENTS

| | | | | |
|---|---|---|---|---|
| 3,879,615 A | * | 4/1975 | Moser ................ | G01N 15/0205 250/574 |
| 5,220,402 A | * | 6/1993 | Harvey ................ | G01N 21/031 356/246 |
| 5,517,314 A | * | 5/1996 | Wallin ................ | G01N 21/274 250/252.1 |
| 5,636,030 A | * | 6/1997 | Limbach ............ | G01B 11/2433 356/612 |
| 5,818,578 A | * | 10/1998 | Inman ................ | C23C 16/4412 356/246 |
| 6,554,452 B1 | * | 4/2003 | Bourn ................ | G01N 21/8806 313/113 |
| 6,844,553 B2 | * | 1/2005 | Daly .................... | G01N 21/031 250/339.07 |
| 6,940,600 B1 | * | 9/2005 | Smith .................. | G01N 21/031 356/437 |
| 7,876,443 B2 | | 1/2011 | Bernacki | |

(Continued)

*Primary Examiner* — Hoa Q Pham
(74) *Attorney, Agent, or Firm* — Klarquist Sparkman, LLP

(57) ABSTRACT

A toroidal optical device can include a ring mirror defining a toroidal optical cavity symmetric about an axis and an optical coupler situated inside the toroidal optical cavity. The optical coupler can be situated to direct an input light first received from outside the toroidal optical cavity propagating inside the toroidal optical cavity, to multiply reflect from the ring mirror inside the toroidal optical cavity. A method includes producing one or more additional ring mirrors defining a toroidal optical cavity symmetric about a sagittal axis using a first ring mirror as a master form, and affixing an optical coupler inside the optical cavity to at least one of the one or more additional ring mirrors.

24 Claims, 12 Drawing Sheets

(56) References Cited

U.S. PATENT DOCUMENTS

| | | | |
|---|---|---|---|
| 8,508,740 B2* | 8/2013 | Richter | G01N 21/031 |
| | | | 356/440 |
| 9,052,232 B2* | 6/2015 | Smith | G01J 3/0291 |
| 9,638,624 B2* | 5/2017 | Mangold | G01N 21/3504 |
| 10,067,049 B1* | 9/2018 | Bambha | G01N 15/00 |
| 10,451,540 B2* | 10/2019 | Baum | G01N 21/31 |
| 2006/0227327 A1* | 10/2006 | McNeal | G01N 21/031 |
| | | | 356/436 |
| 2011/0317165 A1* | 12/2011 | Cole | G01N 21/3504 |
| | | | 356/437 |
| 2016/0084707 A1* | 3/2016 | Scott | G01J 3/0291 |
| | | | 356/326 |

* cited by examiner

TOROIDAL MULTIPASS ABSORPTION DEVICE

ACKNOWLEDGMENT OF GOVERNMENT SUPPORT

This invention was made with government support under Contract DE-AC05-76RL01830 awarded by the U.S. Department of Energy. The government has certain rights in the invention.

FIELD

The field is toroidal multipass optical devices and related methods.

BACKGROUND

Multipass optical devices can be used for absorption spectroscopy of trace gases. For example, the "Herriott" cell is a multipass optical device comprising two mirrors having equal radii of curvature that direct a light beam within the optical cavity formed between the two mirrors. The propagating light beam makes multiple passes in the optical cavity. The long linear shape of the optical cavity of the Herriott cell contributes to a long path length. The Herriott cell is well-suited to laser-based systems due to its ability to re-image or refocus a light beam as the beam traverses the optical cavity, which keeps the beam restricted within the cavity boundaries and conserves the power density of the beam as it propagates within the cavity. However, the long linear cavity of a Herriott cell allows tenacious gas species to attach to sites along the cell wall, making it difficult to purge the cavity between measurements and leading to increased measurement cycle times. Accordingly, a need exists for improved multipass devices that can avoid such drawbacks.

SUMMARY

Disclosed herein are embodiments of a multipass optical device having a virtual laser injection port. In a representative embodiment, a multipass optical device can comprise a ring mirror defining a toroidal optical cavity symmetric about an axis and an optical coupler situated inside the toroidal optical cavity. The optical coupler being situated to direct an input light first received from outside the toroidal optical cavity propagating inside the toroidal optical cavity, to multiply reflect from the ring mirror inside the toroidal optical cavity. The optical coupler can comprise a reflector. The reflector can include a reflective surface situated to receive the first received input light, and the reflective surface can be angled toward the axis relative to a plane that is tangent to an outer radial position of the toroidal optical cavity and parallel to the axis. In some embodiments, the reflector can be a 45-45-90 prism having a hypotenuse side coated with reflective metal. In some embodiments, the reflector can comprise a curved reflective surface. The curved reflective surface can comprise an off-axis parabola.

The optical coupler can be attached to the ring mirror and/or a base surface adjacent to the ring mirror using an adhesive. In other embodiments, the apparatus can further comprise a fixture device comprising an extension member having a first end coupled to an outer edge of the ring mirror and a second end coupled to the optical coupler, the extension member extending parallel to the surface of revolution of the ring mirror. The fixation device can be configured to position the optical coupler in relation to the ring mirror.

The ring mirror can be an astigmatic mirror or can include an astigmatic portion. In some embodiments, the ring mirror can be a first mirror and the apparatus can comprise a second ring mirror, and the first and second ring mirrors can define a toroidal optical cavity between them. In some embodiments, the optical cavity can be an open-air cavity.

In a representative embodiment, a method can comprise producing one or more additional ring mirrors defining a toroidal optical cavity symmetric about a sagittal axis using a first ring mirror as a master form, and affixing an optical coupler inside the optical cavity to at least one of the one or more additional ring mirrors. The method can further comprise diamond turning the first ring mirror defining a toroidal optical cavity symmetric about the sagittal axis. In some embodiments, producing the one or more additional ring mirrors using the first ring mirror as a master form comprises at least one of casting, injection molding, 3D printing, electroforming, and metal spinning.

In a representative embodiment, a method can comprise introducing a gas or gas-phase analyte into an optical cavity defined by a torus structure wherein the torus structure includes at least one ring mirror with a surface of revolution along the circumference that is rotationally symmetric, the at least one ring mirror configured to provide a multipass optical path of predetermined path length. An input light can be directed into the optical cavity at a preselected angle and wavelength using an optical coupler affixed within the optical cavity to the at least one ring mirror, the optical coupler configured to allow the input light to enter into and exit from the optical cavity. The method can further comprise measuring a light-absorption signal for the gas or gas-phase analyte.

The foregoing and other objects, features, and advantages of the disclosed technology will become more apparent from the following detailed description, which proceeds with reference to the accompanying figures.

DETAILED DESCRIPTION

Figure 1:
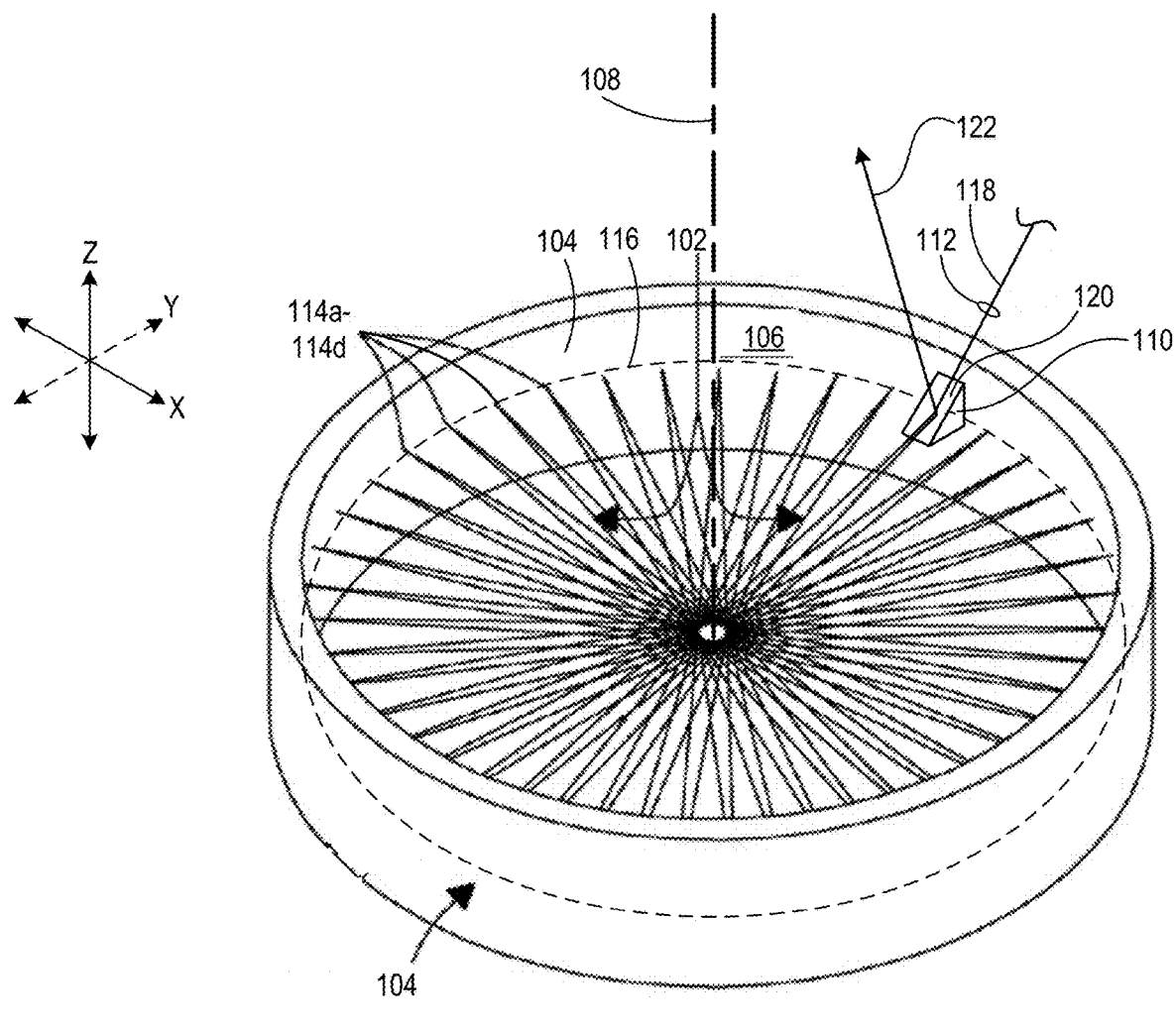
FIG. 1 is a perspective view of a toroidal device.

Absorption spectroscopy of trace gases and gas-phase analytes can be performed using multipass optical devices such as toroidal devices. An input light (e.g., a laser beam) can reflect off the walls of the toroidal device along an optical path through the gas or gas-phase analyte before exiting the device. After the light has exited the optical cavity, it can be analyzed to determine selected characteristics about the gases and/or gas-phase analytes.

Multipass devices can utilize a toroidal shape formed by one or more ring mirrors (e.g., seamless ring mirrors) to provide selected path lengths for absorption of light in various gases. Some examples of such toroidal shapes can be easily aligned, are not prone to misalignment, and mitigate any wall effects. However, the construction of such toroidal devices typically requires boring an opening through an outer ring mirror to provide an aperture or window for light to couple into and out of a cavity defined at least in part by the outer ring mirror. The boring process is expensive and can result in chips, burrs, or other imperfections in the surface of the mirror. Such imperfections can scatter laser light during a multipass process, cause interference patterns arising from the coherent laser light, and reduce the effectiveness of the device. Example toroidal multipass devices described herein avoid these problems by using an optical coupler to couple light into the optical cavity of a toroidal device without requiring that an opening be bored through the side of a ring mirror of the device.

A torus is a doughnut-shaped (e.g., having an external ring and, in some embodiments, an internal ring) structure that has a surface of revolution (e.g., an optical surface) defined by a circle with a radius of curvature (r) in the tangential plane (e.g., the X-Y plane) that is swept a distance (R) from an axis of symmetry. The radial surface can have various curvatures defined by the radius (r) used to generate the surface and radius (R). In Cartesian coordinates, a torus, radially symmetric about the Z-axis, is defined by:

$$(R-\sqrt{x^2+y^2})^2+z^2=r^2 \quad (1)$$

Surfaces of toroidal devices can also be defined in relation to radius values other than circular surfaces of revolution or for configurations where (R) is reduced to zero or negative (i.e., surfaces other than a degenerate sphere).

Mirrors that define the optical cavity of a torus or toroidal optical device can be spherical (e.g., convex, concave), aspherical, astigmatic, or can include combinations of spherical and/or astigmatic mirrors, e.g., convex/concave (spherical); or convex/astigmatic; or astigmatic/concave, or other mirror combinations. Astigmatic mirror surfaces can have a radius of curvature that is different in two perpendicular or orthogonal planes, for example and without limitation, the radius of curvature of the X-Z plane (e.g., the sagittal plane) can be different than the radius of curvature of the Y-Z plane. Various types of spherical or aspherical surfaces can be used to generate an optical surface with preselected optical properties, including, e.g., refractive and reflective properties. Spherical and astigmatic mirrors produce dense Lissajous-type patterns that deliver large path lengths suitable for trace level detection and determination of gases and gas-phase analytes.

The mirrors that define an optical cavity of a torus or toroidal device can be "self-imaging" meaning they refocus light in a propagating beam as the light reflects from mirror surface to mirror surface. Stability parameters of the optical cavity are routinely defined using g-parameters (or quality factors) detailed, e.g., by Siegman (in Lasers, University Science Books, Mill Valley, Calif., 1986, pg. 746), incorporated by reference herein in its entirety. As used herein, various g parameters may be selected based on toroidal geometrical parameters, including radii that define stable, borderline stable, or unstable resonator configurations.

In some embodiments, the optical device can be a single ring torus design with a single spherical mirror. In other embodiments, the optical device can be a single ring torus design with an astigmatic mirror. Further details of single-mirror torus optical devices can be found, for example, in U.S. Pat. No. 7,876,443, incorporated by reference herein in its entirety.

Figure 14:
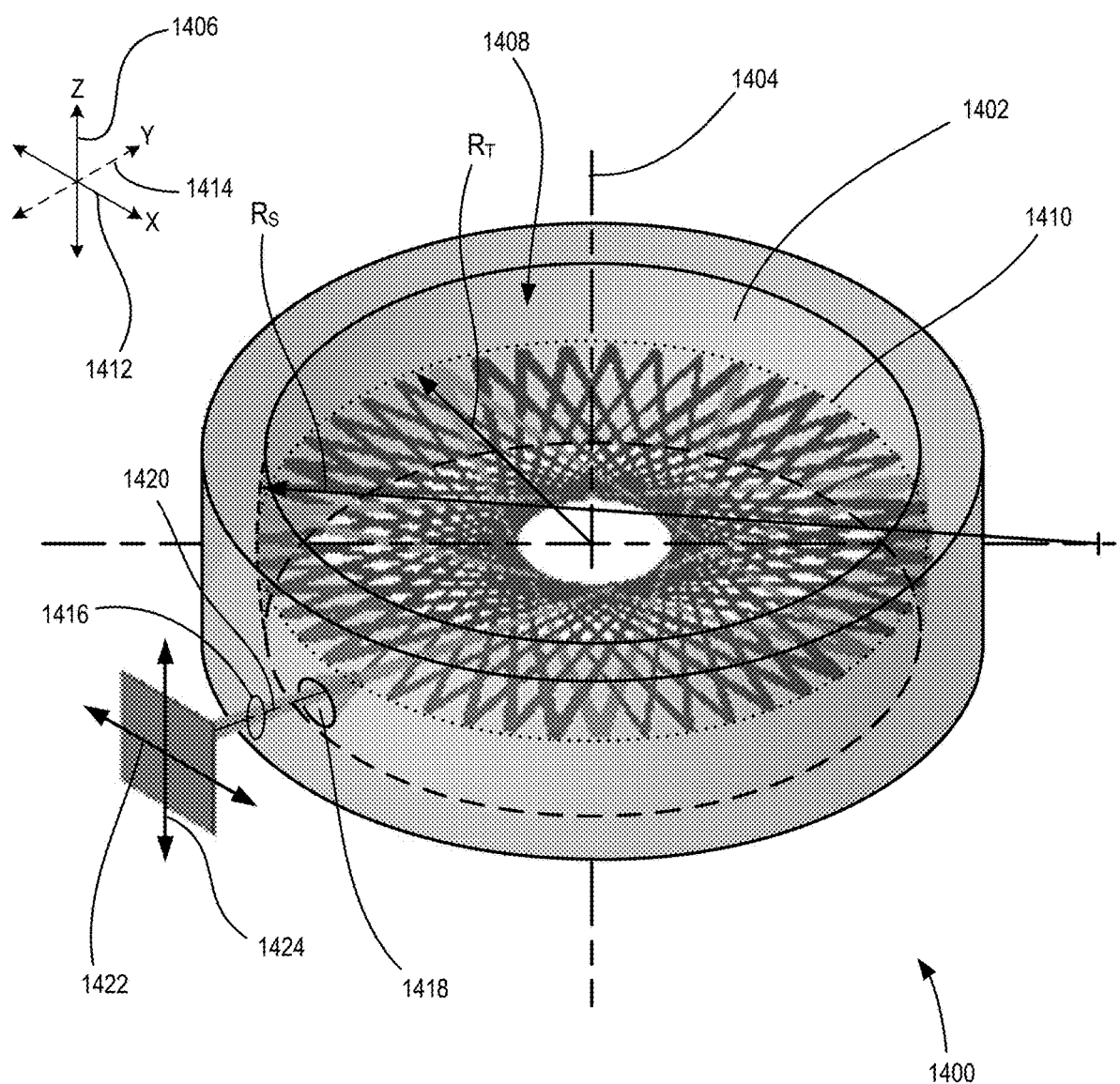
FIG. 14 is a perspective view of another toroidal device.

FIG. 14 shows a toroidal resonator 1400 that includes a ring mirror 1402 rotated at a tangential radius $R_T$ about a sagittal axis 1404 (i.e., in the Z direction 1406) to form an interior volume defining an optical cavity 1408. A tangential plane 1410 (shown at its intersection with the ring mirror 1402) is defined perpendicular to the sagittal axis 1404 (i.e., in the X and Y directions 1412, 1414) and a symmetric curvature across the tangential plane 1410 is defined by a sagittal radius $R_S$. As shown, a center of curvature for the sagittal radius $R_S$ lies at a point in the tangential plane 1410, but as discussed above it will be appreciated that aspheric examples can be defined as well. Also, in different examples a center of curvature can lie at different distances in the tangential plane 1410 (e.g., a concentric position intersecting the sagittal axis 1404, a confocal position at the ring mirror 1402, etc.). A light beam 1416 (such as a laser beam) is directed into the toroidal resonator 1400 through a bore hole 1418 from a position outside the optical cavity 1408. The light beam is directed through the bore hole 1418 along a propagation axis 1420 that lies in the tangential plane 1410, e.g., with a tangential reference direction 1422 of the light beam 1416 as incident to the bore hole 1418 being perpendicular to propagation axis 1420 also lying in the tangential plane 1410. A sagittal reference direction 1424 is generally parallel to the sagittal axis 1404. Inside the optical cavity 1408, the light beam 1416 multiply reflects off the ring mirror 1402 in the tangential plane 1410 to form a star pattern from the multiple reflections before exiting the optical cavity 1408 through the bore hole 1418. The propagation axis 1420 as incident through the bore hole 1418 does not intersect the sagittal axis 1404 and so forms an angle in the tangential plane 1410 such that the light beam 1416 exiting the optical cavity 1408 propagates at an opposite angle in the tangential plane 1410. As discussed herein, in some examples the propagation axis 1420 inside the optical cavity 1408, e.g., as incident through the bore hole 1418 can also include an angle relative to the tangential plane 1410, i.e., in the sagittal reference direction 1424 to produce astigmatic propagation and adjusted path lengths (typically longer) for the multiple passes of the light beam 1416 in the optical cavity 1408.

The star pattern formed by the ring mirror 1402 results in the light beam 1416 propagating in the tangential plane 1410 and can be described by parameters p and q which describe the number of points crossed after reflection from the surface. The parameters p and q must be relatively prime, and p>2*q. Furthermore, the angle of incidence that produces the geometrical star pattern with parameters p and q is given by:

$$\Theta = 90° \cdot \left(1 - \frac{2q}{p}\right) \quad (2)$$

In a particular example, a six inch inner-diameter (152.4 mm) toroid where p is 47 and q is 20 corresponds to an angle Θ of 13.4043°, resulting in the star pattern shown in FIG. 14.

In some examples, the radius of curvature $R_S$ can be selected based on minimizing astigmatism associated with the light beam 1416 reflecting from surface of the ring mirror 1402 at other than a normal angle of incidence (0°). To minimize astigmatism, the radii of the sagittal and tangential curvatures $R_S$, $R_T$ can be selected to satisfy Coddington's equations:

$$\frac{R_s}{R_t} = \cos^2\Theta \qquad (3)$$

In particular, $R_S$ can be selected to obtain better stability of the optical cavity 1408. In the tangential plane 1410, $R_T$=D/2, where D is the diameter of the toroidal resonator 1400. With $R_S$=$R_T$, the optical cavity 1408 is a concentric resonant cavity in the tangential plane 1410 that is borderline stable. In the concentric configuration, the optical cavity 1408 produces large spot sizes on the ring mirror 1402, but very small spot size in the center of the optical cavity 1408. The large spot size on the ring mirror 1402 can contribute to fringing by scattering from the edges of the bore hole 1418 or other launch port if the light beam 1416 is not correctly mode matched. The monolithic construction of the toroidal resonator 1400 as a toroidal cell can mitigate some stability effects by reducing misalignment of the surfaces, though the precision of the fabrication of the toroidal resonator 1400 can determine the extent of the reduction and is demanding in general. In some examples, the radius of curvature $R_S$ can be selected to achieve a confocal condition for the optical cavity 1408, by positioning the center of the sagittal radius of curvature $R_S$ on the surface of the ring mirror 1402. A confocal resonator can be considered the most stable resonator type and is relatively insensitive to fabrication errors of the toroidal cell and corresponding ring mirror 1402. As discussed above, in various examples, the sagittal curvature need not be spherical, and a parabolic curve can provide stigmatic imaging of the light beam 1416 in that plane, in that a collimated beam can produce a perfect point image and is not affected by off-axis illumination of a parallel beam. The radius of curvature $R_S$ can be determined for a parabolic surface in the sagittal direction by using the following equation:

$$\frac{R_s}{2R_t} = \cos^2\Theta \qquad (4)$$

In specifying the sagittal curvature for fabrication of the parabolic surface, a surface with radius $R_S$ found according to Equation 4 can include a conic constant −1, though other conic constants are possible for other surface types such as hyperbolic surfaces, elliptical surfaces, etc.

Figure 15:
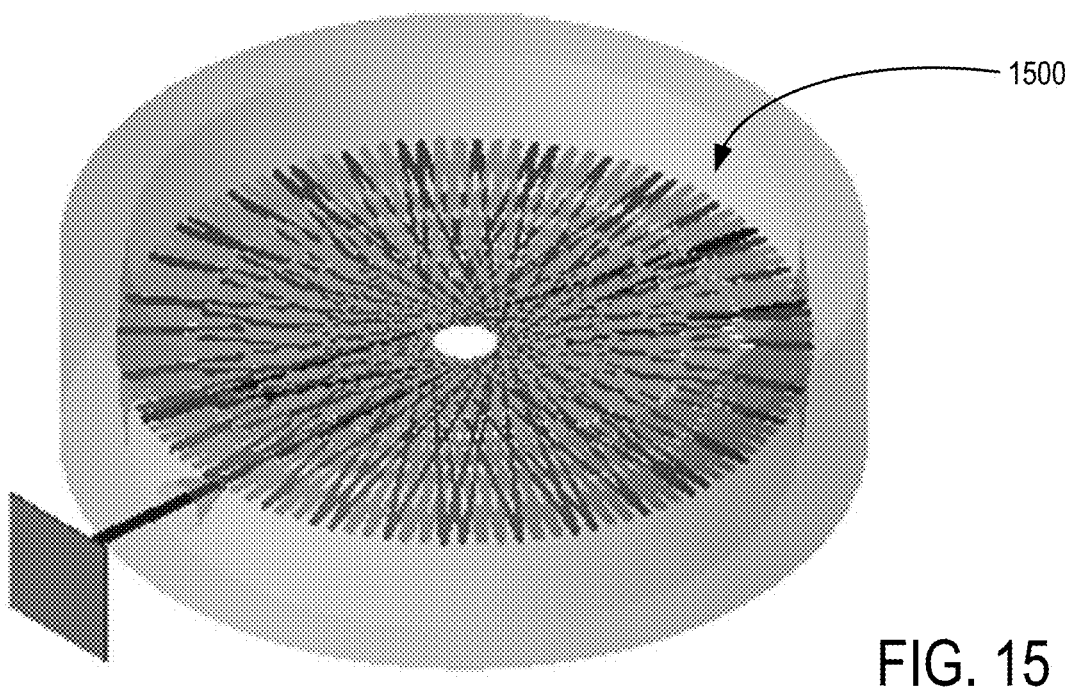
FIGS. 15-16 are perspective views of the toroidal device in FIG. 14 with selected launch angles.
Figure 16:
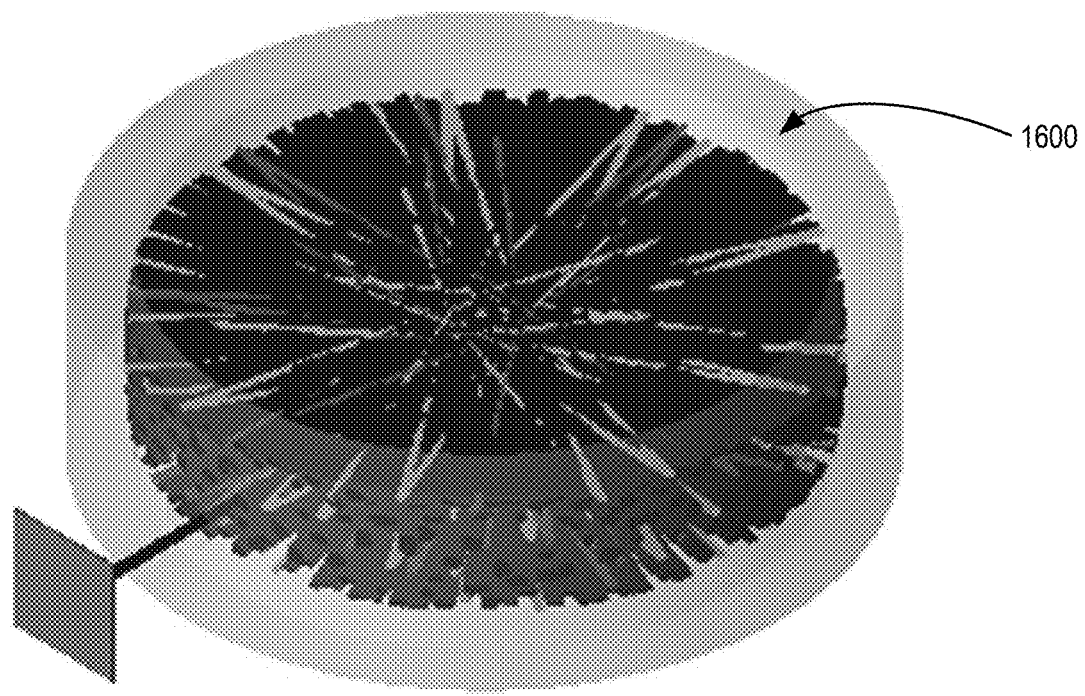

In the toroidal resonator 1400 in which confocal parameters are used for the sagittal curvature $R_S$, and in the case where Coddington's equation is satisfied where $R_S \neq R_S$ an astigmatic condition can be used in which the light beam 1416 is launched off-axis in order to increase the optical path length (OPL) of the optical cavity 1408. As shown in FIG. 15, with the same six inch inner diameter discussed above for the toroidal resonator 1400, parameters p=113, and q=53 can be used to obtain a star pattern 1500 with a 17.2 m OPL using a launch angle in the tangential plane 1410 of 5.57522°. As shown in FIG. 16, if the light beam 1416 is directed through the bore hole 1418 with a compound angle of 5.57522° in the tangential plane 1410, and 2.77° elevation above the tangential plane 1410 (i.e., in the sagittal reference direction 1424, an astigmatic cell-filling pattern 1600 can be obtained in which 63.45 m OPL is achieved in the same instrument footprint as that of the toroidal resonator 1400.

Example 1

Referring now to FIG. 1, a toroidal device 100, or cell, includes an optical cavity 102 defined by at least one ring mirror 104 having a reflective optical surface 106 that is rotationally symmetric about an axis 108. The toroidal device 100 further includes an optical coupler 110 coupled to the ring mirror 104. In some embodiments, the ring mirror 104 can be seamless such that the reflective optical surface 106 does not have seams or joints and is not constructed by joining two or more mirror segments. The shape of the reflective optical surface 106 is configured to reflect and propagate a light beam 112 along multiple passes, e.g., 114a-114d. The light beam 112 can be directed to the optical coupler 110, and the optical coupler 110 couples the light beam 112 into to the optical cavity 102 such that the light beam 112 propagates in a tangential plane 116 of the optical cavity 102 that is perpendicular to the axis 108 or to propagate at one or more angles out of the tangential plane 116. Thus, the ring mirror 104 can define a multipass optical path of a predefined path length for the light beam 112. The predefined path length provided by multipass reflection in the optical cavity 102 can provide for ultra-trace determination of gases and gas-phase analytes situated in the optical cavity 102 during propagation of the light beam 112.

In a representative embodiment, the optical coupler 110 couples the light beam 112 into the optical cavity 102 as received from a sagittal direction (e.g., parallel to the axis 108 or at an angle with respect to the axis 108) outside of the optical cavity 102. For example, the light beam 112 can be directed along an incidence path 118 such that the light beam 112 propagates within the optical cavity for a short distance and is received at a reflective surface 120 of the optical coupler inside the optical cavity 102. The light beam 112 reflects at the reflective surface 120 to propagate in the tangential plane 116 (e.g., parallel to the X-Y plane) and subsequently multiply reflects off the reflective optical surface 106 to trace a star pattern having an optical path of a predetermined length. In representative examples, after multiple reflections, the light beam 112 exits the optical cavity 102 by reflecting at the reflective surface 120 of the optical coupler 106 to become directed along an exit path 122. Typically, the incidence path 118 and the exit path 122 do not coaxially overlap, and an angular separation between the incidence path 118 and the exit path 122 allows an absorption signal associated with the propagation of the light beam 112 through a gas medium in the optical cavity 102 to be extracted and analyzed. For example, the light beam 112 exiting along the exit path 122 can be detected and the detection signal can be compared to characteristics of the light beam 112 incident along the incident path 118 (e.g., without the use of beam-splitting elements).

In representative examples, the optical coupler 110 is a 45-45-90 prism with a flat hypotenuse surface corresponding to the reflective surface 120, which can be a reflective metal. In further examples, the hypotenuse surface is curved to provide focusing or optical power to the light beam 112 received along the incidence path 118. In further examples, the optical coupler 110 can be a diffraction grating or other coupling device. The optical coupler 110 can be secured to the toroidal device 100 in various ways, e.g., with an adhesive such as epoxy, directly to the reflective optical surface 106 or to another intermediate component between the optical coupler 110 and the reflective optical surface 106, or to other parts of the toroidal device 100. The optical coupler 110 can be used to eliminate the need for a bore hole or other optical coupling through the ring mirror 104 and can allow for cost-effective replication methods for manufacturing the toroidal device 100. For example, the need to bore a hole after fabrication which can damage the optical quality of the ring mirror 104 and optical cavity 102 can be removed, and damage to the ring mirror 104 near the edge of the bored hole and associated remachining steps, are avoided.

Example 2

Figure 2:
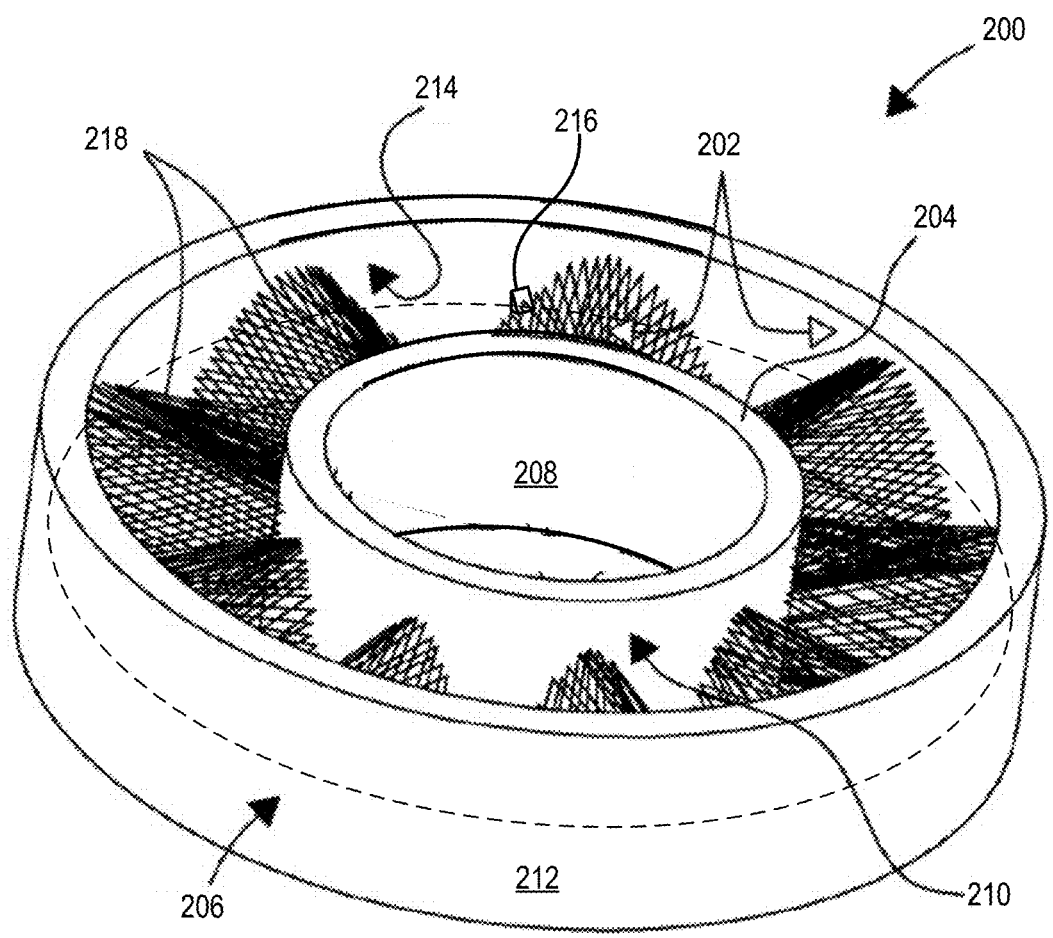
FIG. 2 is a perspective view of another toroidal device, having an astigmatic dual mirror configuration.

FIG. 2 is an optical cell or device 200 having two ring mirrors 204, 206 (e.g., a dual ring torus design) that define an optical cavity 202. The first ring mirror 204 can be contained within the circumference of the second ring mirror 206. In the optical cavity 202, the first (inner) ring mirror 204 surrounds a hub 208. The hub 208 can include an open-air space located at the center of the optical device 200. The first ring mirror 204 can have a surface 210, which is an optical mirror surface. The second (outer) ring mirror 206 can define the outer dimensions of the optical device 200 and includes external surface 212 and internal surface 214, with the internal surface 214 being an optical mirror surface. The optical device 200 also includes an optical coupler 216 configured to couple light into the optical cavity 202.

The surfaces 210, 214 of the first and second ring mirrors 204, 206 can each comprise a surface of revolution that is rotationally symmetric. The surfaces 210, 214 are configured to propagate a light beam 218 introduced to the optical cavity 202 by the optical coupler 216. The light beam 218 can be propagated in a radial direction and/or an axial direction such that the light beam 218 multiply reflects with the first and second ring mirrors 204, 206 to produce a multipass optical path of a predefined path length within the optical cavity 202. The predefined path length of the optical cavity 202 can provide for ultra-trace determination of gases and gas-phase analytes. In some embodiments, one or more of the ring mirrors 204, 206 of the dual ring toroidal device can have spherical and/or astigmatic mirror characteristics.

The g-parameters in a dual ring torus design are defined by:

$$g_1 = 1 - d R_1 \quad (5)$$

$$g_2 = 1 - d R_2 \quad (6)$$

Here, ($R_1$) and ($R_2$) are the respective radii of curvature in the tangential plane of the two ring mirrors, and (d) is the distance between the mirrors. Values for the g-parameters are selected that fall within a range of values corresponding to the resonator stability range so that real and finite solutions to desired Gaussian beam parameters and spot sizes of the light beam 218 propagating in the optical cavity 202 are obtained. The stability range is defined by:

$$0 \leq g_1 \cdot g_2 \leq 1 \quad (7)$$

For two ring mirrors with equal radii, mirror spacing can vary from a value of (d)>0 for a practical cavity up to (d)<2R. For some torus resonator examples with a single ring mirror (such as shown in FIG. 1, described above), ($g_1$)=($g_2$)=(g). The stability condition is then given by:

$$0 \leq g^2 \leq 1 \quad (8)$$

Example 3

Figure 3:
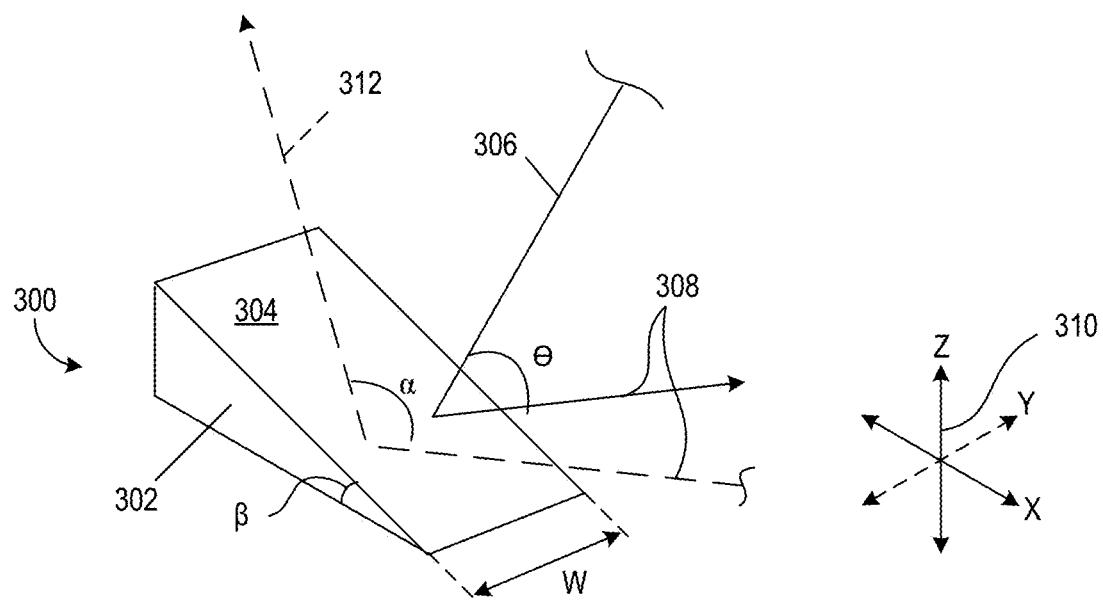
FIGS. 3-4 are perspective views of optical couplers.

Referring now to FIG. 3, an optical coupler 300 includes a reflector 302 having a reflective surface 304. The reflective surface 304 can be situated to receive an input light beam 306 and to direct the input light beam 306 into an optical cavity at a preselected launch angle with respect to an orientation of the optical cavity. For example, the reflective surface 304 can be angled towards an axis of symmetry of a toroidal device relative to a plane that is tangent to a radial position of the optical cavity and parallel to the axis of symmetry, though other angles can be chosen in some examples. The preselected launch angle can include sagittal and tangential components. In some embodiments, the reflector 302 can be a prism (e.g., a 45-45-90 prism) with the reflective surface 304 corresponding to a hypotenuse surface of the prism and that is coated with a reflective metal, for example, gold.

In an exemplary embodiment, the input light beam 306 engages the optical coupler 300 and is introduced into the optical cavity of the toroidal device at the launch angle such that a coupled light beam 308 reflects at an angle Θ and propagates, for example, in an X-Y plane (e.g., perpendicular to the axis of symmetry which can be the Z axis), as shown by coordinate axes 310. The coupled light beam 308 proceeds along the optical path until the coupled light beam 308 exits the optical cavity (shown as dashed line in FIG. 3) as an exit light beam 312 at an exit angle relative to the orientation of the optical cavity, by impinging on the reflective surface 304 of the optical coupler 300 and reflecting at angle α to become redirected at the exit angle. In some examples, the reflection angles Θ, α are equal and the launch and exit angles are different. In representative examples, differences between the launch angle and the exit angle can allow for detection of the exit light beam 312 and comparison of the characteristics of the input light beam 306 and exit light beam 312 to determine optical absorption characteristics of a gas present in the optical cavity. Thus, absorption characteristics can be extracted, measured, and analyzed, including in some examples without the use of beam-splitting elements.

The launch angle and exit angle can be modified by, for example, changing the positioning of the optical coupler 300 relative to an optical surface of the toroidal device. The launch and exit angles can also be adjusted by varying an angle β of the optical coupler 300 or other surface relationships of the optical coupler 300 which can determine the position of the reflective surface 304 in relation to the orientation of the optical cavity. Variations in the launch and exit angles can allow for the selection of varying optical path lengths.

The optical coupler 300 can be sized such that it does not prematurely eject the coupled light beam 308 from the optical cavity. In a particular embodiment, for a 300 mm diameter toroidal device having a 152.4 mm radius of curvature, the reflective surface 304 of the optical coupler 300 can have a width W of 3 mm. In further embodiment, the width W is not constant.

Figure 4:
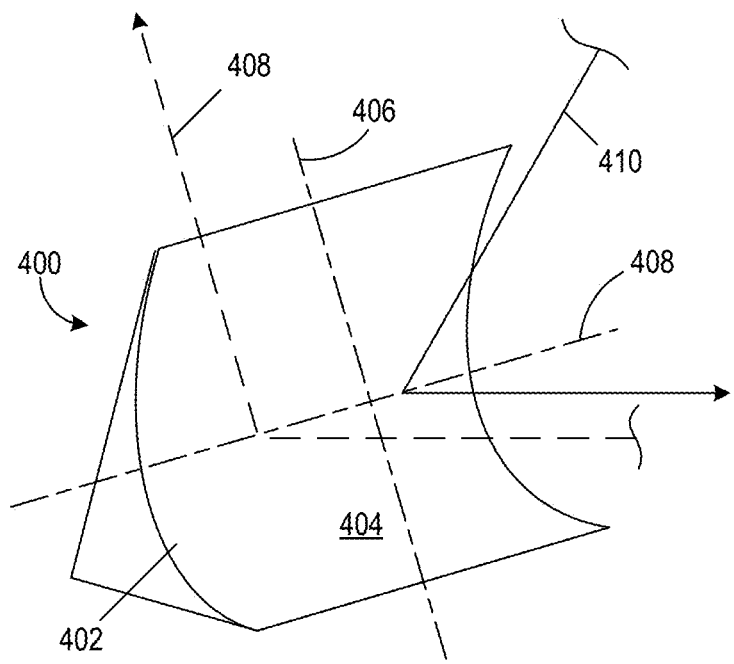

Referring now to FIG. 4, in some embodiments, an optical coupler 400 can include a reflector 402 having a curved reflective surface 404 that can provide optical power (e.g., divergence though more preferably convergence or collimation). In some examples, the curved reflective surface 404 can provide optical power along one axis, such as axis 406, and no optical power along a perpendicular axis, such as axis 408, to form a cylindrical mirror. In further examples, different amounts of optical power can be provided along the different axes 406, 408. In selected examples, the curved reflective surface 404 can be spherical, aspherical, parabolic, etc. In some examples, the curved reflective surface 404 is configured as an off-axis parabola. The reflective surface 404 can be coated with a reflective metal, for example, gold. The curved reflective surface 404 can be configured to receive input light, such as input beam 410, and direct the light to propagate in an optical cavity of a toroidal device at a preselected launch angle. Once the light has propagated along the optical path within the optical cavity of the toroidal device, the optical coupler 400 can couple the light out of the optical cavity at exit angle. In some examples, a separate optical coupler can be used to couple the light out of the optical cavity. The exiting light can be configured as an output beam that can be used to produce an absorption signal 408.

Figure 5:
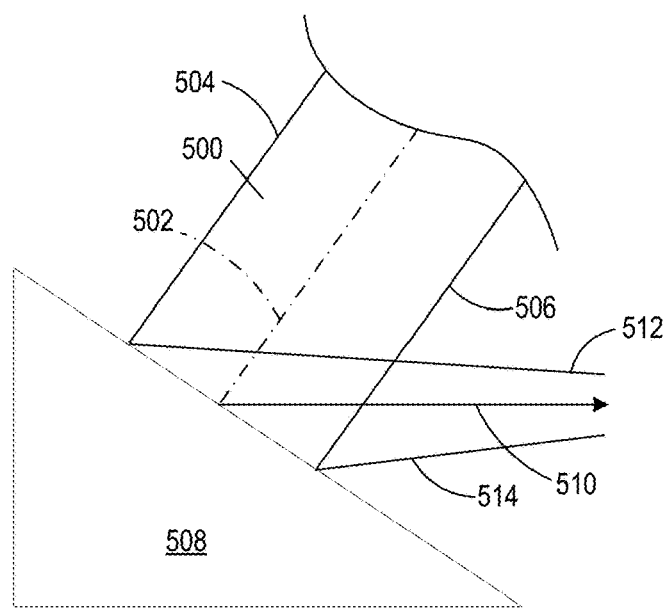
FIGS. 5-7 are side elevation views of optical couplers.
Figure 6:
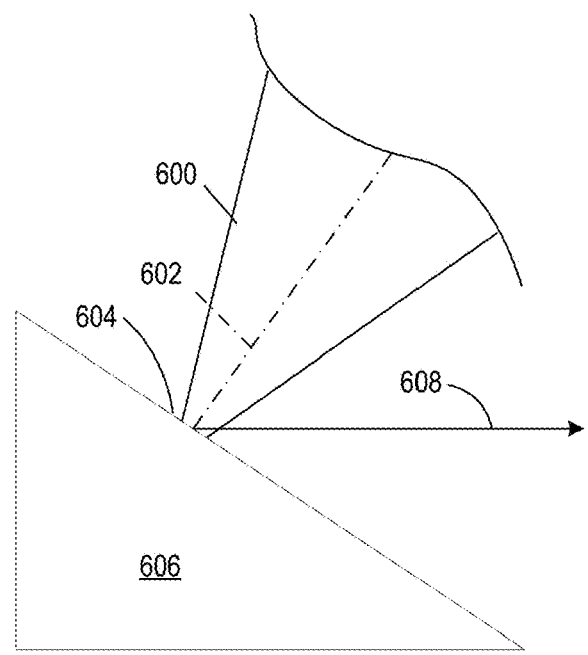
Figure 7:
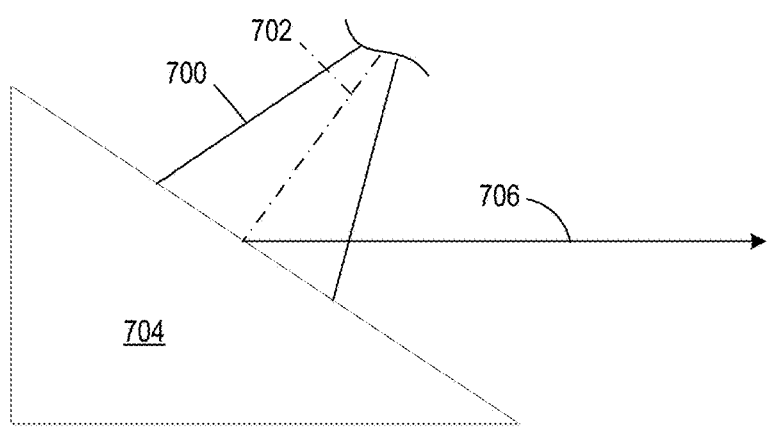

FIG. 5 shows an input beam 500 propagating along an optical axis 502 as a collimated beam across one or more axes (e.g., in the plane of FIG. 5, or in the plane of FIG. 5 and perpendicular to the plane of FIG. 5), with marginal axes 504, 506 being parallel to the optical axis 502. After reflection by an optical coupler 508 that provides optical power, the input beam 500 propagates along reflected optical axis 510, and marginal axes 512, 514 are convergent. In some examples, a divergent beam can also be produced or different degrees of convergence/divergence can be produced across different axes transverse to beam propagation. An input beam can also be a convergent or a divergent beam. For example, FIG. 6 shows an embodiment wherein an input beam 600 is a convergent beam as directed along an optical axis 602 to a reflective surface 604 of an optical coupler 606. After reflection, a coupled beam 608 propagates in an optical cavity, e.g., of a toroidal device. In some examples, the position of incidence of the input beam 602 at the reflective surface 604 can correspond to a beam waist of the input beam 602 or can be proximate the beam waist. In further examples, the input beam 602 can continue to converge after reflection for a significant distance, such that a beam waist or focus is at a center position of a first pass of the coupled beam 608 in the optical cavity, at a toroidal ring mirror surface, or at another position in the optical cavity. The reflective surface 604 can be flat or provide optical power across one or more axes. In another example, FIG. 7 shows an embodiment where an input beam 700 is a divergent beam. In other words, input beam 700 has an area that widens as the beam propagates along an optical axis 702. An optical coupler 704 can receive the input beam 700 and produce a coupled beam 706 that is collimated, convergent, or divergent.

Example 4

Figure 8:
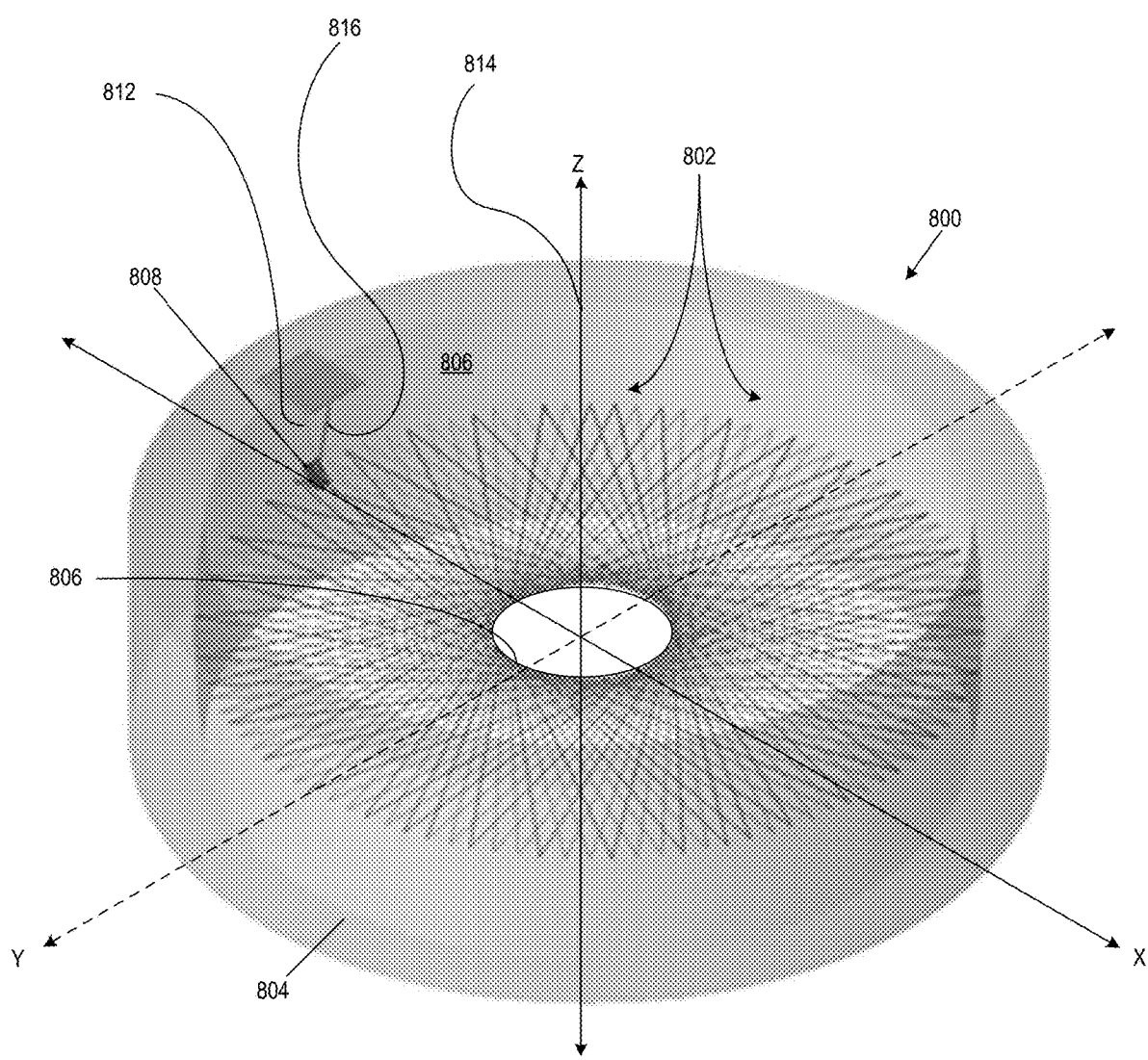
FIG. 8 is a perspective view of a dual mirror optical device.

In some embodiments, as shown in FIG. 8, an optical device 800 can have an optical cavity 802 defined by a ring mirror 804 having an optical surface 806. The optical device 800 can further comprise an optical coupler 808, which can be similar to other optical couplers described herein. The optical coupler 808 can be positioned on the optical surface 806 of the ring mirror 804. In some embodiments, the optical coupler 808 can be attached to a base surface adjacent the ring mirror 804. In some embodiments, the optical coupler 808 can be attached to the optical device 800 using an adhesive. For example, in a particular embodiment, the optical coupler 808 can be attached to the optical device 800 using epoxy.

The optical coupler 808 can be positioned such that an input light 812 can be received by the optical coupler 808 and directed into the optical cavity 802 along the optical axis (e.g., within the X-Y plane as shown by coordinate system 814). The input light 812 coupled into the optical cavity 802 can traverse the optical cavity 802 following an optical path and multiple reflections by the ring mirror 804 that provides a corresponding cumulative path length suitable for trace analysis of gases and gas-phase analytes. After the light has traversed the length of the optical path, the optical coupler 808 can receive the light, now configured as an exit beam 816, and direct the light out of the optical cavity 802.

In some embodiments, the optical device 800 can be configured where the optical cavity 802 is open to the air. Open-air torus devices can be used when pressure broadening and interferences are not expected. In other embodiments, the optical cavity 802 can be fully sealed and either partially or fully evacuated (e.g., using vacuum pumps). The optical cavity 802 can be sealed with a first side wall configured as a roof and a second side wall configured as a floor. The first and second side walls can extend parallel to the tangential plane (i.e., the X-Y plane). In some embodiments, the first side wall and/or the second side wall can comprise a translucent or transparent portion allowing light to enter through the transparent portion such that it engages the optical coupler 810 and propagates within the optical cavity. Sealed torus devices with reduced pressure or evacuated environments can be used when desired absorption spectra or features of a gas or analyte of interest could be obscured by collisional broadening at atmospheric pressure. Representative examples can have features in common with the devices described in FIG. 14 but without a bore hole through the ring mirror 804.

Example 5

Figure 9:
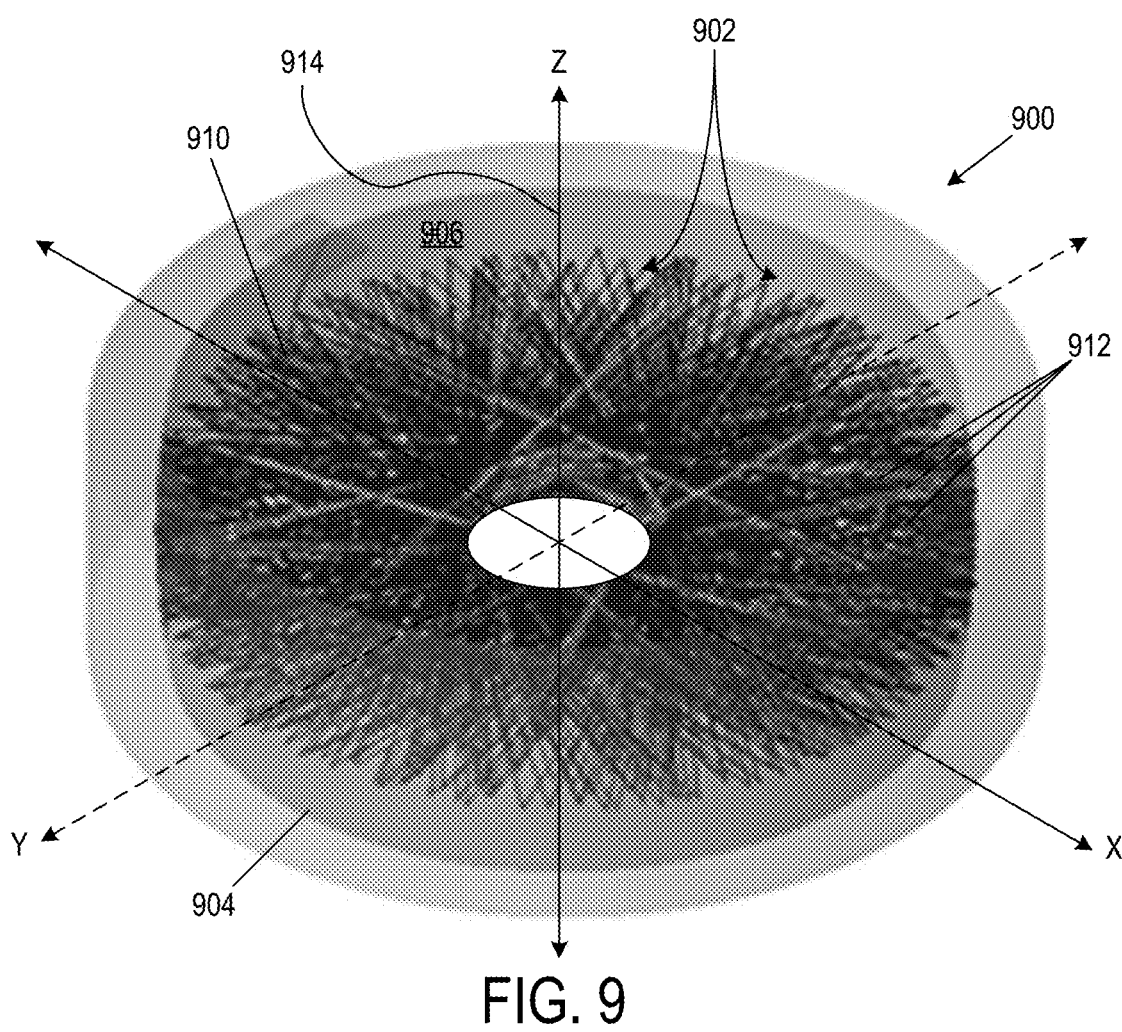
FIG. 9 is a perspective view of an astigmatic dual mirror optical device.

FIG. 9 shows an optical device 900 having an optical cavity 902 defined by a ring mirror 904 having an optical surface 906 (e.g., the surface of each mirror oriented toward the optical cavity 902). The optical device 900 can further comprise an optical coupler 910 attached to an optical surface of, for example, the ring mirror 904. The optical coupler 910 can be similar to other optical couplers described herein. The optical coupler 910 can be attached to the optical device 900 using, for example, an adhesive such as an epoxy.

As shown, the optical coupler 910 can be positioned at an off-axis position (e.g., a position not within the X-Y plane). The positioning can be selected to increase the optical path length of a light beam 912 coupled into optical cavity 902. The light beam 912 can propagate in the optical cavity obliquely to a tangential plane (i.e., the X-Y plane as shown by coordinate system 914), thus traversing the optical cavity 902 along a multipass optical path that provides a corresponding cumulative path length suitable for trace analysis of gases and gas-phase analytes.

Such devices can be referred to as "astigmatic devices" in which an initial launch angle of the input light beam 912 is a compound angle that is off-axis in both the tangential and sagittal planes. The compound launch angle can increase the optical path length of the device. For example, as discussed above, a non-astigmatic device having a 6-inch diameter, a p of 47, a q of 20, and a launch angle of 13.4043° can have an optical path length of approximately 7 meters. In another example, an astigmatic device with a 6-inch diameter, a p of 113, a q of 53, and a launch angle of 5.57522° can have an optical path length of approximately 17.2 meters. In still another example, an astigmatic device with a 6-inch diameter, a p of 113, a q of 53, and a compound launch angle of 5.57522° in the tangential plane and 2.77° in the sagittal plane can have an optical path length of 63.45 meters in the same 6-inch footprint.

Example 6

Figure 10:
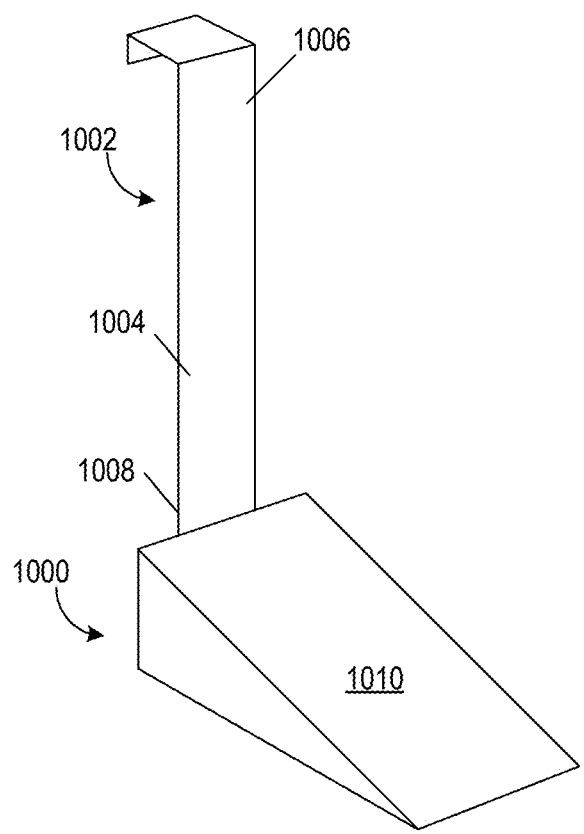
FIG. 10 is a perspective view of an optical coupler.

In some embodiments, such as shown in FIG. 10, an optical coupler 1000 (e.g., similar to other optical couplers described herein) can be attached to an optical surface of a ring mirror using a fixture device, such as fixture device 1002. In some embodiments, the fixture device 1002 can be configured as an extension member 1004 having a first end portion 1006 configured to engage a top edge of an exterior wall (e.g., using a hook or other mechanical means such as screws, anchors, etc.) of a the ring mirror or other structural component of a toroidal device. A second end portion 1008 of the extension member 1004 can be coupled to the optical coupler 1000. The extension member 1004 can be sized such that the reflective surface 1010 of the optical coupler 1000 is positioned at a preselected location and orientation to couple light into an optical cavity defined by the ring mirror, such as into or in relation to an associated tangential plane.

Example 7

Figure 11:
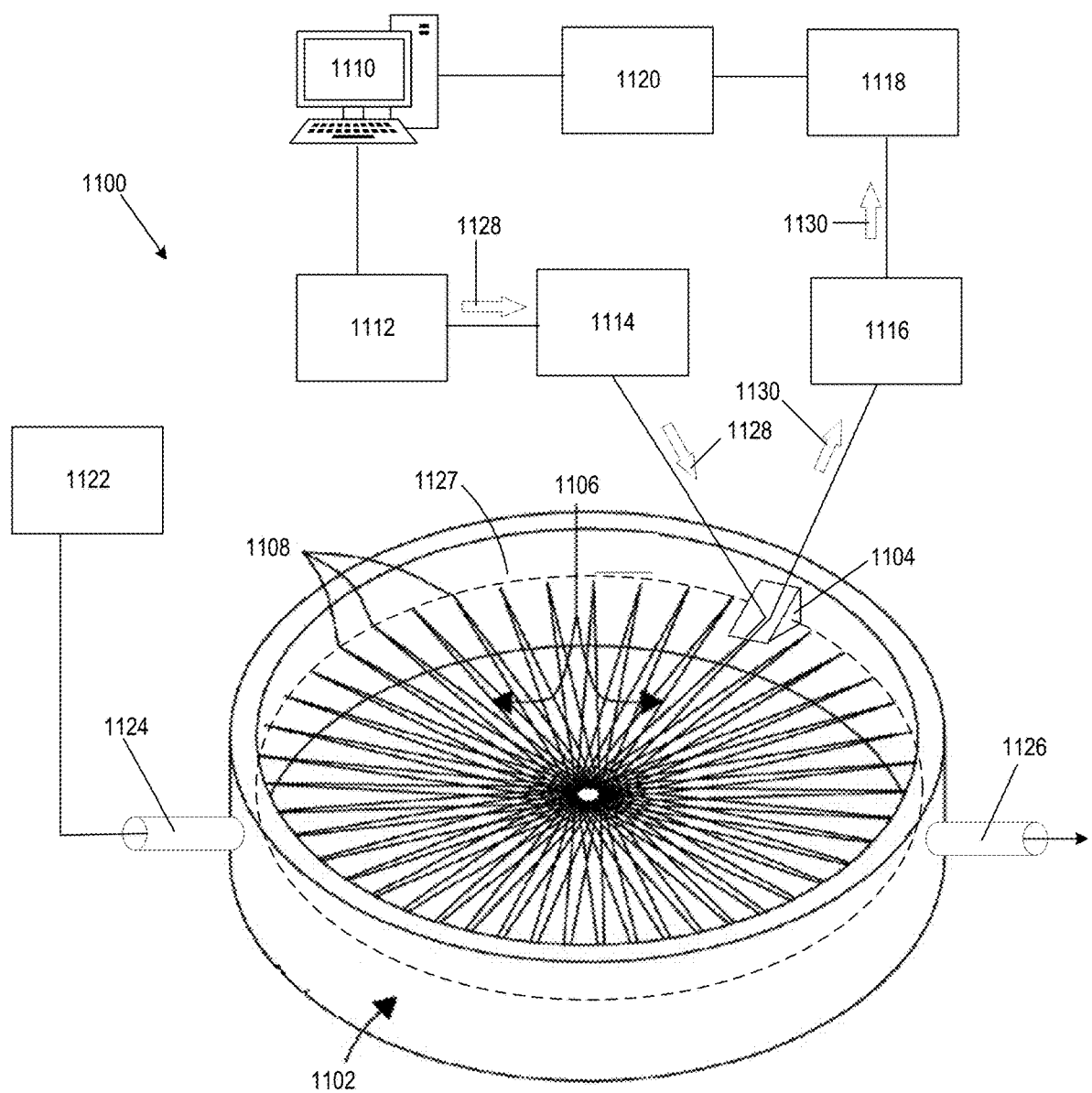
FIG. 11 is perspective schematic of gas absorption analysis system.

FIG. 11 shows an exemplary analysis system 1100 that includes an optical device 1102 having an optical coupler 1104 configured to couple light into an optical cavity 1106 of the optical device 1102 so that a light beam 1108 can be propagate and form a star pattern through multiple reflections. The system 1100 can be used for analysis (e.g., absorption spectroscopy) of gases and gas-phase analytes.

The system 1100 can comprise a control unit 1110 (e.g., a computer) operatively coupled to a light source 1112 (e.g., a diode laser, a quantum cascade laser, a tunable quantum cascade laser, or another laser source). The light source 1112 can be operatively coupled to beam steering, focusing, and/or mode-matching optics 1114. The control unit 1110 can control the light source 1112 and optics 1114 to direct an input light beam 1128 into the optical device 1102 using the optical coupler 1104. The optics 1114 can include, but are not limited to, plane mirrors, lenses, and/or electronics components (e.g., laser power supply, modulation source).

The system 1100 can further comprise detection optics 1116 (e.g., plate beam splitters and detector lenses) for detecting an output beam 1130 coupled out of the optical device 1102 by the optical coupler 1104. The detection optics 1116 can be operatively coupled to an optical detector 1118, such as a thermo-electrically cooled HgCdTe detector. The optical detector 1118 can be operatively coupled to a lock-in amplifier 1120 (e.g., a phase-sensitive or lock-in amplifier).

Any or all of the above-described system components can be operatively coupled to the control unit 1110, such that the control unit can control the operation of system 1100. The control unit 1110 can be configured to receive and/or transmit data to and/or from any of the components of the analysis system.

In some embodiments, such as shown in FIG. 11, the system 1100 can further comprise an analyte source 1122. An inlet line 1124 provides for introduction of gases and/or gas-phase analytes into the optical cavity 1106 from the analyte source, and an outlet line 1126 provides for removal of gases and gas-phase analytes from the optical cavity 1106. The inlet line 1124 and/or outlet line 1126 can be coupled through surfaces other than a ring mirror 1127 defining the optical cavity 1106.

In use, the input light 1128 is launched from the light source 1112 into the optical cavity 1106 of the optical device 1102 using optical coupler 1104. The light beam 1108 propagates within the optical cavity and is coupled out of the optical cavity 1106 as an output light beam 1130. The detector 1118 can produce an absorption signal that can be used by the analysis system 1100 to extract, measure, and/or analyze characteristics of the gas or gas-phase analyte.

In the illustrated embodiment, the system components are shown as external to the optical device, however, in other embodiments, one or more system components can be positioned within or coupled to the optical device.

Example 8

The above described torus devices can be used for absorption spectroscopy of trace gases. Different molecules, analytes, and gas species of interest require different path lengths in order to determine whether the selected analyte is present at the selected detection limit and/or selected concentration. The initial launch angle of the light beam can be selected based on the desired number of passes (e.g., the optical path length) within the optical cavity.

Figure 12:
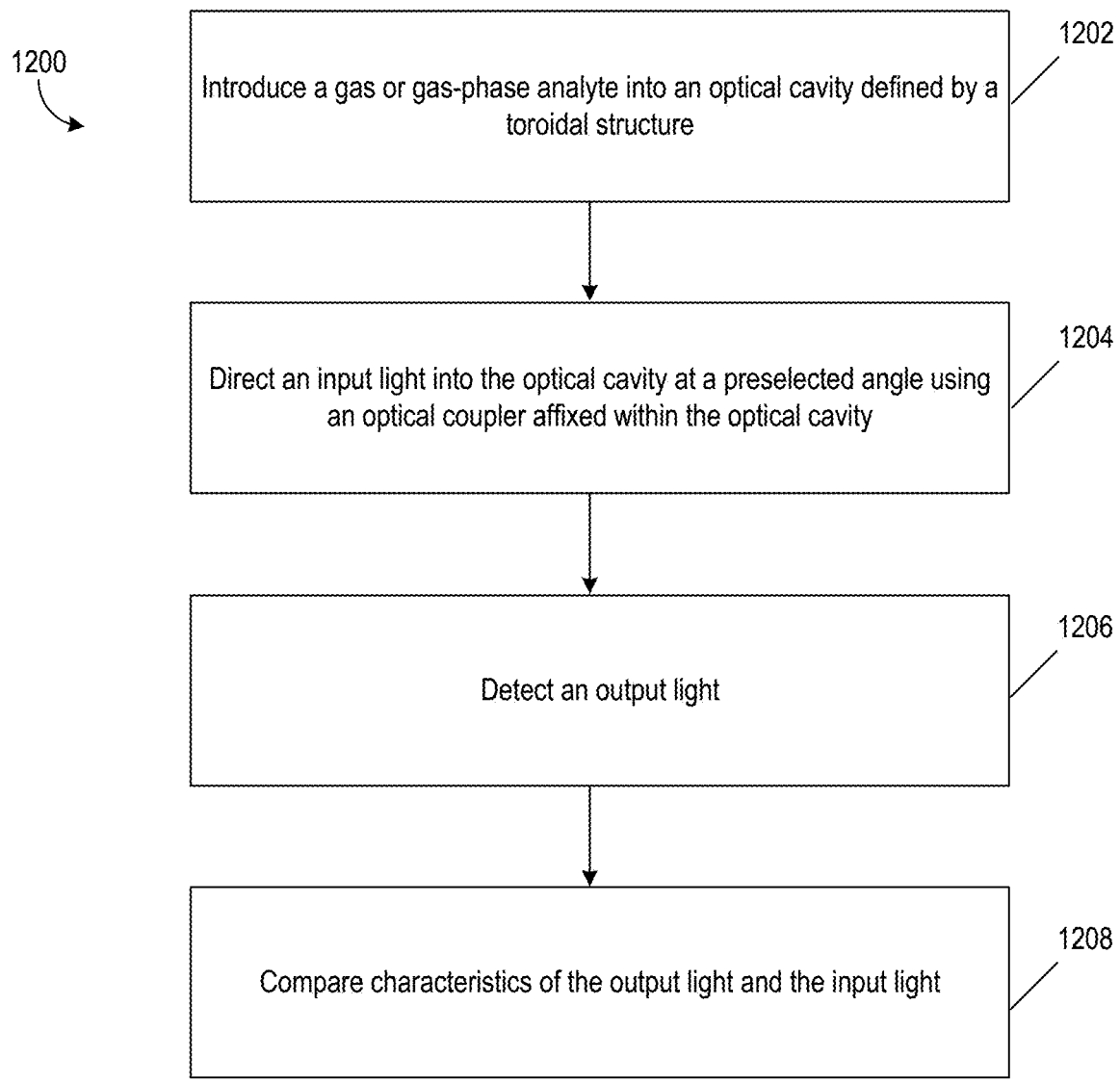
FIG. 12 is a flow diagram of a method for performing absorption spectroscopy using an optical device.

Referring to FIG. 12, a representative method 1200 of identifying a gas or gas-phase analyte includes, at 1202, introducing a gas or gas-phase analyte into the optical cavity of a toroidal. At 1204, an input light, such as a laser beam, can be directed into the optical cavity using an optical coupler at a selected launch angle and a selected wavelength, resulting in a selected optical path length. At 1206, an output light is directed out of the optical cavity, such as with the optical coupler, and the output light is detected with an optical detector. At 1208, characteristics of the output light and input light can be compared to determine properties of the gas or gas-phase analyte.

In some embodiments, the laser can be a tunable laser. The tunable laser can tune across a broad spectral region, for example, a spectral region where spectral absorption features of the selected species (e.g., gases or gas-phase analytes), or features of a majority of species, are expected. In other embodiments, the laser can comprise multiple disrupted feedback lasers can be used. The multiple disrupted feedback lasers can tune in the molecular fingerprint region, or in the overtone region, of atmospheric molecules or analytes of interest. The laser can be tuned in wavelength while transmission of the beam through the optical device is monitored, allowing for direct absorption spectroscopy.

After the laser beam has been directed into the optical cavity, the gas or gas-phase analyte can absorb a portion of the beam. The resulting non-absorbed portions of the beam (e.g., the absorption signal) can then exit the optical cavity at a preselected exit angle. The light or absorption signal that exits the optical cavity can be extracted, measured, and analyzed. For example, the absorption signal can be extracted using an optical detector (e.g., a thermo-electrically cooled HgCdTe detector) and/or detection optics comprising plate beam splitters and detector lenses. The absorption signal can then be analyzed to determine the identity of the gas or gas-phase analyte.

In a particular example, wavelength modulation spectroscopy can be used in combination with 2f detection to detect weak signals or signals that are obscured by collisional broadening. The laser can be modulated with a small-signal sinusoidal modulation as its wavelength is increased across its scan range. A phase-sensitive detector can then be used to extract the absorption signal at an enhanced signal-to-noise ratio.

Example 9

The above-described torus devices can be constructed of materials including, but not limited to, metals, ceramics (e.g., AlOx, silicon carbide, tungsten carbide), glasses (e.g., silicate glasses, oxide glasses, fluoride glasses), and/or combinations thereof. The ring mirrors each are preferably formed as one piece to minimize seams or other interferences in the optical cavity.

Figure 13:
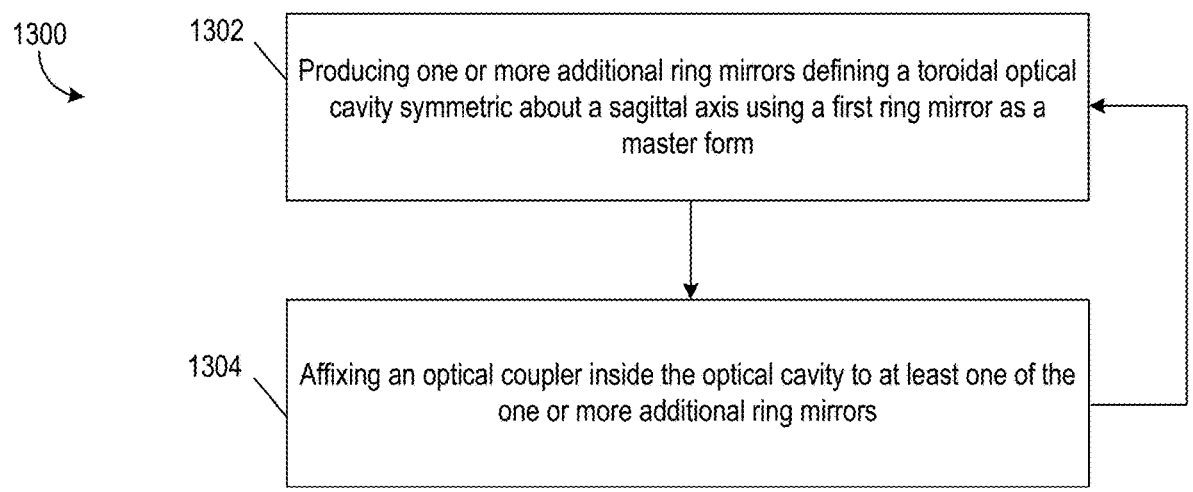
FIG. 13 is a flow diagram of a method of making one or more optical devices.

Referring to FIG. 13, a representative method 1300 of making an optical device comprises producing one or more additional ring mirrors defining a toroidal optical cavity symmetric about a sagittal axis using a first ring mirror as a master form at 1302. At 1304, an optical coupler is affixed inside the optical cavity of at least one of the one or more additional ring mirrors.

The first ring mirror can be machined using a diamond turning process or other deterministic fabrication process to minimize aberrations in the optical surfaces. For a particular ring mirror, a radius of curvature can be introduced that creates a path length achieving the desired signal-to-noise result for determination of gases and gas-phase analytes. The signal-to-noise ratio obtained from an analysis is a function of the absorption characteristics of each gas or gas-phase analyte, laser power, mirror reflectivity, and detector shot noise limit. The optical surfaces of the torus structure can be mirrored using, for example, electroplating, or other surface mirroring process.

The one or more additional ring mirrors can be molded from the first diamond-turned ring mirror using, for example, a variety of processes including, but not limited to, casting, injection molding, 3D printing, electroforming, and/or metal spinning.

Once the torus structure has been assembled, an optical coupler can be affixed to the torus structure such that the reflective surface is angled relative to a plane tangent to the outer radial position of the toroidal optical cavity. The optical coupler can be affixed to the torus structure using, for example, an epoxy or other adhesive. In other embodiments, the optical coupler can be coupled to the torus structure using a fixture device, such as the fixture devices discussed previously. The optical coupler can couple light into and out of the optical cavity defined by the torus structure.

Once a selected number of additional ring mirrors have been made, a respective optical coupler can be coupled to a respective optical surface of each ring mirror. In some embodiments, each optical coupler can be coupled to a respective surface using an adhesive (e.g., epoxy). In other embodiments, each optical coupler can be coupled to a respective optical surface using a fixture device, such as the fixture devices described above. In this way, a plurality of torus optical devices can be made without having to diamond-turn each additional ring mirror, thus mitigating the cost of such a process.

In a typical torus device, a hole is bored through either the radially outer or radially inner wall to direct an input light into the optical cavity. However, such holes are costly and can cause damage to the optical surface of the torus device. Torus devices that use an optical coupler as described above, can mitigate costs and mitigate damage to the optical surface of the device.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

The term "spherical" as used herein in reference to reflective mirror surfaces means a mirror surface that has spherical curvature, e.g., convex spherical curvature or concave spherical curvature. The term "aspherical" in reference to reflective mirror surfaces means that the mirror surface deviates from spherical curvature, typically to reduce optical aberrations in light beams. The term "astigmatic" in reference to reflective mirror surfaces means the mirror surface has a deviation from spherical curvature that distorts electromagnetic radiation (i.e., light rays) and prevents convergence of the light beam, which yields a distorted point pattern on the mirror surface. The term "re-image" refers to the ability of a mirror surface in a first location to present (image) a light ray of equal intensity at a second mirror surface in a second location (axis, direction, or plane).

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosed technology may be applied, it should be recognized that the illustrated embodiments are only preferred examples and should not be taken as limiting the scope of the disclosed technology. Rather, the scope of the disclosed technology is defined by the following claims. We therefore claim all that comes within the scope of these claims.

We claim:

1. An apparatus, comprising:
a ring mirror defining a toroidal optical cavity symmetric about an axis, wherein the surface of the ring mirror does not include an opening;
an optical coupler comprising a reflector including a reflective surface, the optical coupler situated inside the toroidal optical cavity, attached to an inner surface of the ring mirror, and situated to direct an input light, first received from outside the toroidal optical cavity propagating inside the toroidal optical cavity, to multiply reflect from the ring mirror inside the toroidal optical cavity;
wherein the reflective surface is situated to receive the first received input light; and
wherein the reflective surface is angled toward the axis relative to a plane that is tangent to an outer radial position of the toroidal optical cavity and parallel to the axis.

2. The apparatus of claim 1, wherein the reflector is a 45-45-90 prism having a hypotenuse side coated with reflective metal.

3. The apparatus of claim 1, wherein the reflector comprises a curved reflective surface.

4. The apparatus of claim 3, wherein the curved reflective surface comprises an off-axis parabola.

5. The apparatus of claim 1, wherein the optical coupler is attached to the ring mirror and/or a base surface adjacent to the ring mirror using an adhesive.

6. The apparatus of claim 1, further comprising a fixture device comprising an extension member having a first end coupled to an outer edge of the ring mirror and a second end coupled to the optical coupler, the extension member extending parallel to the surface of revolution of the ring mirror, wherein the fixation device is configured to position the optical coupler in relation to the ring mirror.

7. The apparatus of claim 1, wherein the ring mirror is an astigmatic mirror or includes an astigmatic portion.

8. The apparatus of claim 1, wherein the ring mirror is a first ring mirror, wherein the apparatus comprises a second ring mirror, and wherein the first and second mirrors define the toroidal optical cavity between them.

9. The apparatus of claim 1, wherein the optical cavity is an open-air cavity.

10. The apparatus of claim 1, wherein the optical coupler is further situated to direct an output light received from within the toroidal cavity to exit the toroidal optical cavity along an exit path.

11. The apparatus of claim 10, wherein the incidence path and the exit path have an angular separation such that output light can be extracted.

12. A method, comprising:
producing one or more additional ring mirrors defining a toroidal optical cavity symmetric about a sagittal axis using a first ring mirror as a master form, wherein the surface of each ring mirror does not include an opening; and
affixing an optical coupler inside the optical cavity to an inner surface of at least one of the one or more additional ring mirrors, the optical coupler situated to direct an input light, first received from outside the toroidal optical cavity propagating inside the toroidal optical cavity, to multiply reflect from the ring mirror inside the toroidal optical cavity.

13. The method of claim 12, further comprising diamond turning the first ring mirror defining a toroidal optical cavity symmetric about the sagittal axis.

14. The method of claim 12, wherein producing the one or more additional ring mirrors using the first ring mirror as a master form comprises at least one of casting, injection molding, 3D printing, electroforming, and metal spinning.

15. The method of claim 12, wherein affixing the optical coupler to each ring mirror comprises coupling the optical coupler to a radially interior surface of the ring mirror using epoxy.

16. The method of claim 12, wherein affixing the optical coupler to each ring mirror comprises using a fixture device to position the optical coupler in relation to the ring mirror, the fixture device comprising an extension member having a first end coupled to an outer edge of the ring mirror and a second end coupled to the optical coupler, the extension member extending parallel to the surface of revolution of the ring mirror.

17. The method of claim 12, wherein the optical coupler comprises a mirror having an angled surface, wherein the angled surface is angled relative to a plane tangent to an outer radius of the torus structure.

18. The method of claim 12, wherein the optical coupler comprises an off-axis parabola.

19. A method, comprising:
introducing a gas or gas-phase analyte into an optical cavity defined by a torus structure wherein the torus structure includes at least one ring mirror with a surface of revolution along the circumference that is rotationally symmetric, the surface of the ring mirror not including an opening, the at least one ring mirror configured to provide a multipass optical path of predetermined path length; and
directing an input light into the optical cavity at a preselected angle and wavelength using an optical coupler affixed within the optical cavity to the at least one ring mirror, the optical coupler configured to allow the input light to enter into and exit from the optical cavity.

20. The method of claim 19, further comprising measuring a light-absorption signal for the gas or gas-phase analyte.

21. The method of claim 19, wherein the optical coupler comprises a reflector including a reflective surface situated to receive the input light, wherein the reflective surface is angled relative to a plane tangent to an outer radial position of the toroidal optical cavity.

22. The method of claim 19, wherein the reflector is a 45-45-90 prism having a hypotenuse side coated with reflective metal.

23. The method of claim 19, wherein the optical coupler comprises an off-axis parabola.

24. The method of claim 19, wherein the optical coupler is coupled to the at least one ring mirror using epoxy.

* * * * *